(12) United States Patent
Ota

(10) Patent No.: US 10,744,989 B2
(45) Date of Patent: Aug. 18, 2020

(54) BRAKE DEVICE FOR VEHICLE

(71) Applicant: ADVICS CO., LTD., Kariya-shi (JP)

(72) Inventor: Yuki Ota, Kariya (JP)

(73) Assignee: ADVICS CO., LTD., Kariya-shi (JP)

( * ) Notice: Subject to any disclaimer, the term of this patent is extended or adjusted under 35 U.S.C. 154(b) by 88 days.

(21) Appl. No.: 16/078,097

(22) PCT Filed: Feb. 17, 2017

(86) PCT No.: PCT/JP2017/005797
§ 371 (c)(1),
(2) Date: Aug. 21, 2018

(87) PCT Pub. No.: WO2017/150205
PCT Pub. Date: Sep. 8, 2017

(65) Prior Publication Data
US 2019/0047533 A1    Feb. 14, 2019

(30) Foreign Application Priority Data

Feb. 29, 2016 (JP) ................................. 2016-038218

(51) Int. Cl.
*B60T 13/74* (2006.01)
*H02P 29/68* (2016.01)
(Continued)

(52) U.S. Cl.
CPC .............. *B60T 13/745* (2013.01); *B60T 8/17* (2013.01); *B60T 8/172* (2013.01); *B60T 13/74* (2013.01);
(Continued)

(58) Field of Classification Search
CPC ...... B60T 13/745; B60T 13/74; B60T 13/741; B60T 13/746; B60T 13/18; B60T 8/4059;
(Continued)

(56) References Cited

U.S. PATENT DOCUMENTS 8,281,886 B2 * 10/2012 Saha ..................... B60L 15/025
180/65.285
2006/0180365 A1 * 8/2006 Innami ................. B60K 7/0007
180/65.51
(Continued)

FOREIGN PATENT DOCUMENTS

| JP | 2008-184057 A | 8/2008 |
|----|---|---|
| JP | 2015-44514 A | 3/2015 |
| JP | 2015-144530 A | 8/2015 |

OTHER PUBLICATIONS

International Search Report dated May 16, 2017 in PCT/JP2017/005797 filed Feb. 17, 2017.

*Primary Examiner* — Bradley T King
*Assistant Examiner* — Stephen M Bowes
(74) *Attorney, Agent, or Firm* — Oblon, McClelland, Maier & Neustadt, L.L.P.

(57) ABSTRACT

This brake device is provided with: a brake actuator which applies to a wheel a brake torque depending on the rotation of an electric motor; a booster circuit which boosts a reference voltage outputted from a battery; and a motor control unit which controls the electric motor. Depending on the state of the booster circuit, the motor control unit switches between a first drive process for driving the electric motor by supplying thereto a boost voltage, which is a voltage that has been boosted by the booster circuit, and a second drive process for driving the electric motor by supplying a reference voltage to the electric motor and by performing spark advance control.

2 Claims, 5 Drawing Sheets

(51) Int. Cl.
  *B60T 8/17*   (2006.01)
  *B60T 8/172*  (2006.01)
  *H02P 27/06*  (2006.01)
(52) U.S. Cl.
  CPC .............. *H02P 27/06* (2013.01); *H02P 29/68* (2016.02); *B60T 2270/404* (2013.01); *B60T 2270/82* (2013.01)
(58) Field of Classification Search
  CPC .. B60T 8/404; B60T 2270/84; G06F 11/3058; G11B 33/144; H02P 29/68
  USPC ................................ 318/471, 472, 473, 500
  See application file for complete search history.

(56) References Cited

U.S. PATENT DOCUMENTS

| | | | |
|---|---|---|---|
| 2008/0179941 A1 | 7/2008 | Matsushita | |
| 2012/0098507 A1* | 4/2012 | Hasegawa | H02M 1/32 323/271 |
| 2013/0311026 A1* | 11/2013 | Endo | B60L 3/0046 701/22 |
| 2015/0061366 A1 | 3/2015 | Shimada et al. | |
| 2015/0291053 A1* | 10/2015 | Sato | B60L 11/1872 307/10.1 |

* cited by examiner

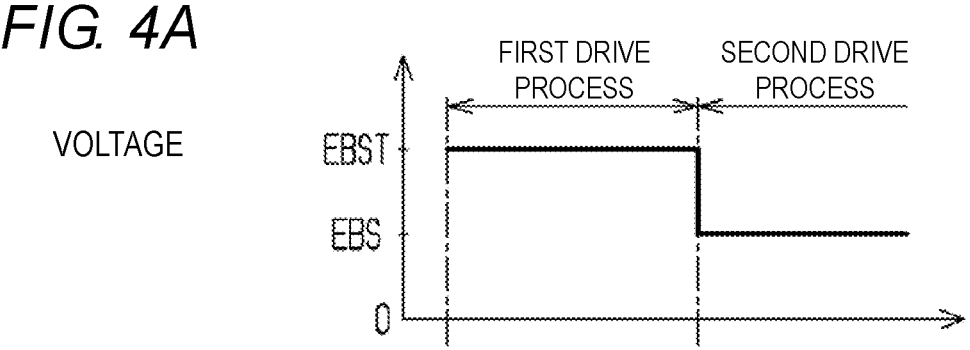
FIG. 4A
VOLTAGE
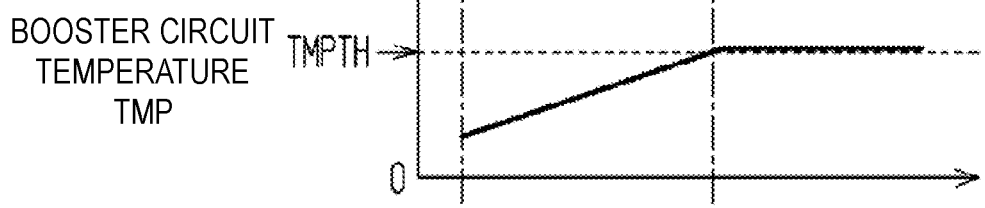
FIG. 4B
BOOSTER CIRCUIT TEMPERATURE TMP
FIG. 4C
ELECTRIC MOTOR ROTARY SPEED MV
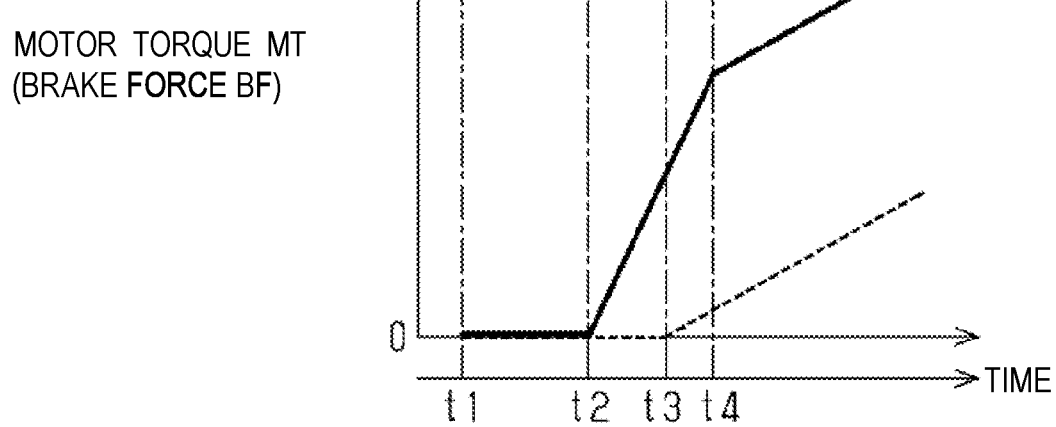
FIG. 4D
MOTOR TORQUE MT (BRAKE FORCE BF)

BRAKE DEVICE FOR VEHICLE

TECHNICAL FIELD

The present invention relates to a brake device for a vehicle provided with a brake actuator configured to apply brake force to a wheel in accordance with a rotary amount of an electric motor.

BACKGROUND ART

Patent Literature 1 describes an example of a brake actuator configured to apply brake force to a wheel in accordance with a rotary amount of an electric motor. A vehicle provided with such a brake actuator is provided with a rotary body (for example, disk rotor) configured to rotate integrally with the wheel and a friction member (for example, brake pad) to be pressed against the rotary body by force transferred from the brake actuator.

Further, Patent Literature 1 also describes that an electric motor is driven by an advance angle control (which is also called "field weakening control"). In this advance angle control, a magnetic flux in a d-axis direction is reduced to increase rotary speed of the electric motor by setting an excitation current value of a q-axis component to a value corresponding to torque to be generated by the electric motor and setting an excitation current value of a d-axis component to a negative value. Due to this, by performing such an advance angle control, a friction member quickly approaches a rotary body as compared to a case of performing a normal motor control that is not the advance angle control. As a result, a timing to start applying brake force to a wheel can be brought forward.

CITATIONS LIST

Patent Literature

Patent Literature 1: JP 2008-184057 A

SUMMARY OF INVENTION

Technical Problems

Indeed, an advance angle control can increase rotary speed of an electric motor; however, torque output from the electric motor does not increase easily. Due to this, in a situation where a friction member has not yet abutted a rotary body, load applied to the electric motor is still small, by which the rotary speed of the electric motor is increased and applying brake force to a wheel can be promptly started. However, when the friction member abuts the rotary body and starts applying the brake force to the wheel, the load applied to the electric motor abruptly increases. Due to this, as compared to the case of performing the normal motor control that is not the advance angle control, increasing speed of the brake force to be applied to the wheel becomes small as the torque output from the electric motor does not increase easily.

An aim of the present invention is to provide a brake device for a vehicle which starts to apply brake force to a wheel at an earlier stage while enabling to suppress drop in increasing speed of this brake force after having started to apply the brake force to the wheel.

Solutions to Problems

A brake device for a vehicle that solves the above problem includes: a brake actuator including an electric motor and configured to apply brake force to a wheel in accordance with a rotary amount of the electric motor; a booster circuit configured to boost a reference voltage, which is a voltage output from a vehicle-mounted power source; and a motor control unit configured to control the electric motor. Further, the motor control unit is configured to switch between a first drive process to drive the electric motor by supplying the electric motor with a boost voltage, which is a voltage boosted by the booster circuit, and a second drive process to drive the electric motor by an advance angle control by supplying the electric motor with the reference voltage supplied from the vehicle-mounted power source, based on a state of the booster circuit.

In the above brake device for a vehicle, in a case of being provided with a temperature acquisition unit configured to acquire a temperature of the booster circuit, the motor control unit is preferably configured to perform the first drive process when a temperature of the booster circuit acquired by the temperature acquisition unit is less than a switching temperature determination value and to perform the second drive process when the temperature of the booster circuit is equal to or greater than the switching temperature determination value.

Here, as an upper limit value of a temperature at which the booster circuit can be used, a usable temperature upper limit value that is greater than the switching temperature determination value may be preset. In this case, it can be said that the booster circuit is in a state in which it is not preferably operated when the temperature of the booster circuit is equal to or greater than the switching temperature determination value and less than the usable temperature upper limit value, whereas the booster circuit is in a state in which it should not be operated when the temperature of the booster circuit is equal to or greater than the usable temperature upper limit value. Due to this, supply of the boost voltage to the electric motor is prohibited when the temperature of the booster circuit is equal to or greater than the usable temperature upper limit value.

In this case, when the brake force is to be applied to the wheel in a situation where the temperature of the booster circuit acquired by the temperature acquisition unit is equal to or greater than the switching temperature determination value and is less than the usable temperature upper limit value, the motor control unit may activate the electric motor by the second drive process and then may perform the first drive process after applying the brake force to the wheel has been started.

BRIEF DESCRIPTION OF DRAWINGS

FIG. 4 shows timing charts for a case where it is determined that the driver operating the brake pedal is demanding sudden braking, where (*a*) is a timing chart indicating shifts of a voltage supplied to the electric motor, (*b*) is a timing chart indicating shifts in a temperature of a booster circuit, (*c*) is a timing chart indicating shifts in rotary speed of the electric motor, and (*d*) is a timing chart indicating shifts in motor torque (or brake force).

DESCRIPTION OF EMBODIMENTS

Hereinbelow, an embodiment implementing a brake device for a vehicle will be described with reference to FIGS. 1 to 4.

Figure 1:
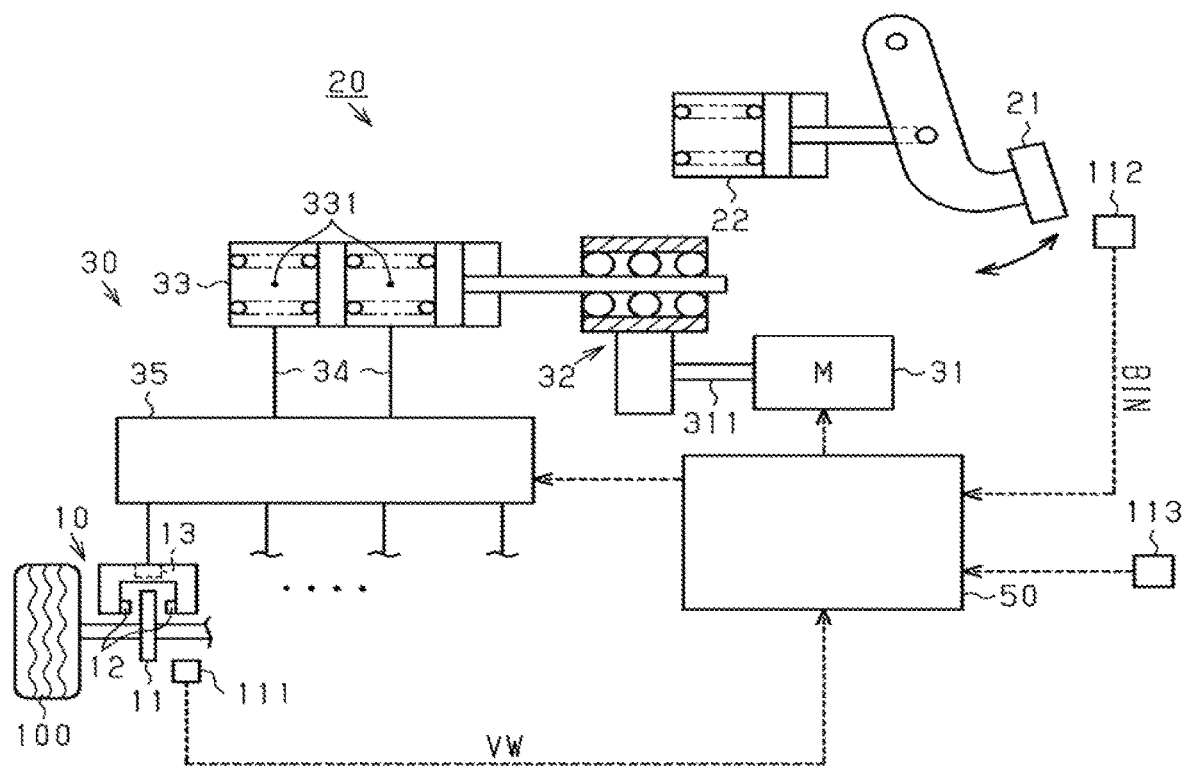
FIG. 1 is a schematic diagram illustrating a schematic configuration of an embodiment of a brake device for a vehicle.

FIG. 1 illustrates an example of a vehicle provided with a brake device 20 for a vehicle of the present embodiment. As illustrated in FIG. 1, the vehicle is provided with one brake mechanism 10 per each of plural wheels 100 (only one is illustrated in FIG. 1), respectively. The brake mechanisms 10 are each configured to apply brake force BFBF to its corresponding wheel 100 by pressing friction members 12 against a rotary body 11 which rotates integrally with the wheel 100. A force by which the rotary body 11 is pressed against the friction members 12 is greater when a liquid pressure inside a wheel cylinder 13 (hereinbelow may be termed "WC pressure") is higher.

The brake device 20 for a vehicle is provided with a master cylinder 22 configured to generate a liquid pressure in accordance with an operation on a brake pedal 21, a brake actuator 30 configured to adjust the WC pressures in the wheel cylinders 13, and a control device 50 configured to control the brake actuator 30.

The brake actuator 30 is provided with an electric motor 31 configured to be capable of rotating an output shaft 311 in both forward and reverse directions, a converting mechanism 32 configured to convert rotary motion of the electric motor 31 into linear motion, and a slave cylinder 33 to which power from the electric motor 31 is transferred through the converting mechanism 32. As the electric motor 31, for example, a three-phase brushless motor may be exemplified. A slave pressure, which is a liquid pressure generated in a liquid pressure chamber 331 of the slave cylinder 33, can be adjusted by a rotary amount of the electric motor 31. That is, the slave pressure is high when the output shaft 311 of the electric motor 31 is rotating in the forward direction and the rotary amount of the electric motor 31 is increased, and is low when the output shaft 311 is rotating in the reverse direction being an opposite direction of the forward direction and the rotary amount of the electric motor 31 is decreased. Further, the slave cylinder 33 is configured to supply brake fluid in an amount corresponding to the slave pressure to a liquid pressure adjustment unit 35 through a connection passage 34.

The respective wheel cylinders 13 are connected to the liquid pressure adjustment unit 35. Further, in a non-operating state of the liquid pressure adjustment unit 35, brake fluid at an amount corresponding to a supplied amount of the brake fluid from the slave cylinder 33 is supplied into the wheel cylinders 13. In this case, the WC pressure in each wheel cylinder 13 becomes substantially equal to the slave pressure in the slave cylinder 33. That is, the WC pressure is high when the output shaft 311 of the electric motor 31 is rotating in the forward direction and the slave pressure becomes high, and the brake force BFBF applied to the wheels 100 becomes greater. On the other hand, the WC pressure is low when the output shaft 311 of the electric motor 31 is rotating in the reverse direction and the slave pressure becomes low, and the brake force BF applied to the wheels 100 becomes smaller. That is, this brake actuator 30 is capable of applying the brake force BF corresponding to the rotary amount of the electric motor 31 to the wheels 100.

Next, the control device 50 will be described with reference to FIGS. 1 and 2.

As illustrated in FIG. 1, the control device 50 has wheel speed sensors 111, a stroke sensor 112, and a brake switch 113 electrically connected thereto. The wheel speed sensors 111 are provided for each wheel 100, and are configured to detect wheel speed VW of their corresponding wheels 100. The stroke sensor 112 is configured to detect a brake operation amount BIN being the operation amount on the brake pedal 21. The brake switch 113 is configured to detect whether or not the brake pedal 21 is being operated.

Figure 2:
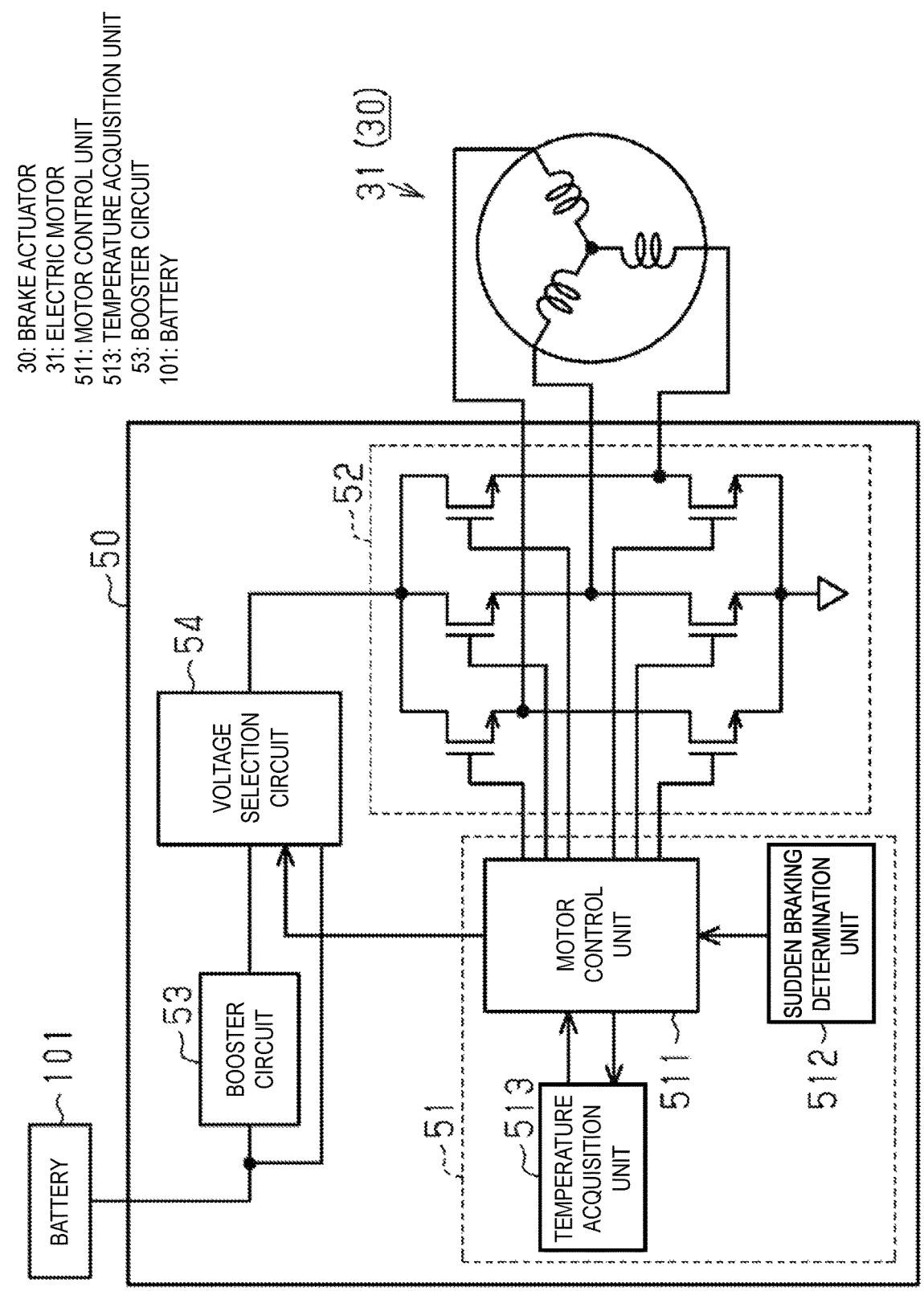
FIG. 2 is a block diagram illustrating a circuit configuration of a control device and an electric motor to be controlled by the control device in the brake device.

As illustrated in FIG. 2, the control device 50 is provided with a microcomputer 51, a drive circuit 52 for the electric motor 31, a booster circuit 53 configured to boost a reference voltage EBS, which is a voltage of a battery 101 being an example of a vehicle-mounted power source, and a voltage selection circuit 54 configured to select a boost voltage EBST being a voltage boosted by the booster circuit 53 or the reference voltage EBS and to output the same to the drive circuit 52. The drive circuit 52 is a known circuit for driving a three-phase brushless motor (that is, the electric motor 31), and includes a plurality of switching elements. The booster circuit 53 is configured to generate the boost voltage EBST, which is a voltage that is obtained by boosting the reference voltage EBS by N times (N being a value greater than 1, for example, "2"), and to be capable of outputting this boost voltage EBST. The voltage selection circuit 54 operates to supply one of the reference voltage EBS and the boost voltage EBST to the electric motor 31 through the drive circuit 52 in accordance with an instruction from the microcomputer 51 (more specifically, a motor control unit 511 to be described later).

The microcomputer 51 includes the motor control unit 511, a sudden braking determination unit 512, and a temperature acquisition unit 513 as its function units for controlling the electric motor 31. The motor control unit 511 drives the electric motor 31 by outputting an instruction to turn on or off to each of the switching elements of the drive circuit 52. Further, the motor control unit 511 further controls an operation of the voltage selection circuit 54. That is, the motor control unit 511 is capable of controlling the rotary direction of the output shaft 311 of the electric motor 31, the rotary speed MV of the electric motor 31 being the rotary speed of the output shaft 311, and motor torque MT being torque output from the electric motor 31.

In this embodiment, three processes are prepared as drive processes for driving the electric motor 31. That is, among the three drive processes, a first drive process is a process for driving the electric motor 31 by supplying the boost voltage EBST to the electric motor 31 through the drive circuit 52 and by an advance angle control (which is also termed "field weakening control") that is different from a normal motor control. Further, a second drive process is a process for driving the electric motor 31 by supplying the reference voltage EBS to the electric motor 31 through the drive circuit 52 and by the advance angle control. Further, a third drive process is a process for driving the electric motor 31 by supplying the reference voltage EBS to the electric motor 31 through the drive circuit 52 and by the normal motor control. Moreover, the motor control unit 511 uses these three drive processes for different circumstances to control the electric motor 31.

Here, the advance angle control is a control by which a magnetic flux in a d-axis direction is reduced and the rotary speed MV of the electric motor 31 is increased by setting an excitation current value pf a q-axis component to a value corresponding to torque to be generated in the electric motor 31 and setting an excitation current value of a d-axis component to a negative value. In this case, since the magnetic flux in the d-axis direction is reduced, the rotary speed MV of the electric motor 31 is increased as compared to a case of driving the electric motor 31 by the normal motor control; however, the motor torque MT is less likely to become large.

The sudden braking determination unit 512 is configured to determine whether or not sudden braking is necessary. For example, the sudden braking determination unit 512 calculates increasing speed of the brake operation amount BIN based on a detection signal from the stroke sensor 112 acquired when the driver starts to operate the brake pedal 21, that is, immediately after the signal from the brake switch 113 has switched from off to on. Then, the sudden braking determination unit 512 determines that the sudden braking is necessary when the calculated increasing speed of the brake operation amount BIN is equal to or greater than sudden braking determination speed, and outputs this determination to the motor control unit 511. On the other hand, the sudden braking determination unit 512 determines that the sudden braking is not necessary when the calculated increasing speed of the brake operation amount BIN is less than the sudden braking determination speed, and outputs this determination to the motor control unit 511.

The temperature acquisition unit 513 is configured to estimate and calculate a temperature of constituent components of the booster circuit 53, that is, a temperature TMP of the booster circuit 53. For example, the temperature acquisition unit 513 performs calculation such that the temperature TMP of the booster circuit 53 becomes gradually higher as a period during which the booster circuit 53 is operating, that is, a period during which the boost voltage EBST generated by the booster circuit 53 is supplied to the drive circuit 52 becomes longer. On the other hand, the temperature acquisition unit 513 performs calculation such that the temperature TMP of the booster circuit 53 becomes lower as a period during which the booster circuit 53 is not operating, that is, a period during which the boost voltage EBST is not supplied to the drive circuit 52 becomes longer. Then, the temperature acquisition unit 513 outputs information related to the calculated temperature TMP of the booster circuit 53 to the motor control unit 511.

The temperature acquisition unit 513 can acquire information on whether or not the boost voltage EBST is supplied to the drive circuit 52 from the motor control unit 511.

Next, with reference to FIG. 3, a process routine which the motor control unit 511 performs when the signal from the brake switch 113 is on, that is, when the brake pedal 21 is being operated by the driver will be described. This process routine is performed each time in a preset control cycle while the signal from the brake switch 113 is on.

Figure 3:
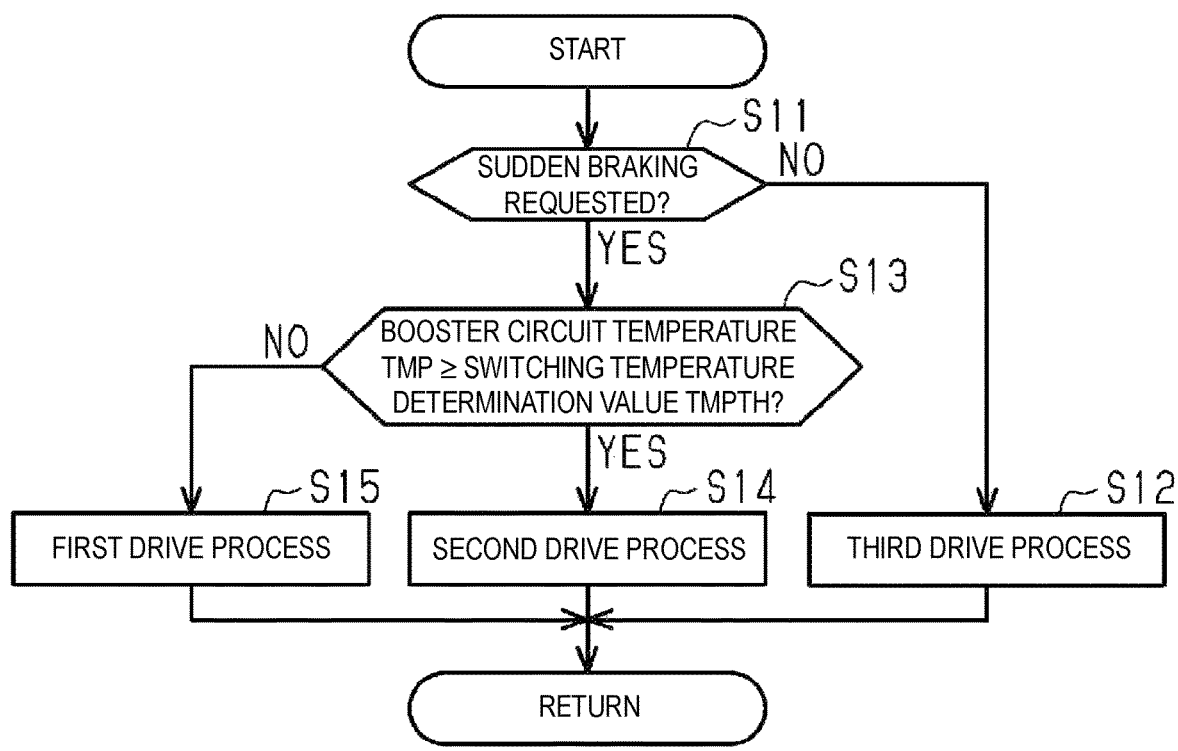
FIG. 3 is a flowchart explaining a process routine which a motor control unit is to perform in the brake device when a driver is operating a brake pedal.

As illustrated in FIG. 3, in this process routine, the motor control unit 511 determines whether or not there is a request for sudden braking based on information input from the sudden braking determination unit 512 (step S11). In a case where the sudden braking is being requested, it is preferable to quickly bring the friction members 12 to abut on the rotary body 11 in the brake mechanism 10 and promptly create a state in which the brake force BF can be applied to the wheel 100. On the other hand, in a case where the sudden braking is not requested, there is a lower need to promptly create the state in which the brake force BF can be applied to the wheel 100.

Due to this, in the case where there is no request of the sudden braking (step S11: NO), the motor control unit 511 drives the electric motor 31 by performing a third drive process (step S12). After this, the motor control unit 511 temporarily terminates the process routine.

On the other hand, in the case where there is a request of the sudden braking (step S11: YES), the motor control unit 511 determines whether or not the temperature TMP of the booster circuit 53 calculated by the temperature acquisition unit 513 is equal to or greater than a switching temperature determination value TMPTH (step S13). In a case where the temperature TMP of the booster circuit 53 is equal to or greater than the switching temperature determination value TMPTH, an actual temperature of the booster circuit 53 is relatively high, and it is not preferable from an aspect of protection of the booster circuit 53 to continue the operation of the booster circuit 53 for generating the boost voltage EBST, that is, to keep supplying the boost voltage EBST to the electric motor 31. Due to this, in this embodiment, the boost voltage EBST is refrained from being supplied to the electric motor 31 in the case where the temperature TMP of the booster circuit 53 is equal to or greater than the switching temperature determination value TMPTH.

Thus, in the case where the temperature TMP of the booster circuit 53 is equal to or greater than the switching temperature determination value TMPTH (step S13: YES), the motor control unit 511 drives the electric motor 31 by performing a second drive process (step S14). After this, the motor control unit 511 temporarily terminates the process routine. On the other hand, in a case where the temperature TMP of the booster circuit 53 is less than the switching temperature determination value TMPTH (step S13: NO), the motor control unit 511 drives the electric motor 31 by performing a first drive process (step S15). After this, the motor control unit 511 temporarily terminates the process routine.

Next, workings and effects achieved upon when the increasing speed of the brake operation amount BIN is large and the sudden braking is determined as necessary will be described together with reference to timing charts illustrated in FIG. 4. In FIGS. 4 (c) and (d), solid lines indicate the case of the present embodiment which uses the first drive process and the second drive process for different circumstances, and broken lines indicate a case of a comparative example in which the electric motor 31 is driven by the second drive process.

As illustrated in FIGS. 4 (a), (b), (c), and (d), when the operation on the brake pedal 21 by the driver is started at a first timing t1, since the driver is requesting the sudden braking, the electric motor 31 is activated by the first drive process. In this case, the advance angle control is performed as the boost voltage EBST, being a higher voltage than the reference voltage EBS, is supplied to the electric motor 31. Due to this, the rotary speed MV of the electric motor 31 suddenly becomes large.

Here, an upper limit value of the rotary speed MV of the electric motor 31 is greater when the voltage supplied to the electric motor 31 is higher. That is, compared to a case where the reference voltage EBS is supplied to the electric motor 31 as in the case of the comparative example, the present embodiment can further increase the rotary speed MV of the electric motor 31. Due to this, in the case of the comparative example, the friction members 12 abut the rotary body 11 at a third timing t3 and the brake force BF is enabled to be applied to the wheel 100, that is, the motor torque MT starts to be generated. Contrary to this, in the present embodiment, the friction members 12 abut the rotary body 11 at a second timing t2 which is earlier than the third timing t3, thereby enabling the brake force BF to be applied to the wheel 100. Thus, in the activation of the electric motor 31, in the case where the temperature TMP of the booster circuit 53 is less than the switching temperature determination value TMPTH, applying the brake force BF to the wheel 100 can be started at an earlier stage since the boost voltage EBST being higher than the reference voltage EBS can be supplied to the electric motor 31.

When the brake force BF starts to be applied to the wheel 100 at the second timing t2 as above, the electric motor 31 is continued to be driven from the second timing t2 and thereafter, so that the brake force BF is increased. In this case, since the performance of the first drive process is being continued, the increasing speed of the brake force BF at this occasion becomes larger as compared to the case of the comparative example in which the reference voltage EBS is supplied to the electric motor 31. This is because the motor torque MT easily increases due to the boost voltage EBST higher than the reference voltage EBS being supplied to the electric motor 31, as compared to in the case of the comparative example in which the reference voltage EBS is supplied to the electric motor 31. Thus, the start of the applying of the brake force BF to the wheel 100 can be brought forward, and a drop in the increasing speed of the brake force BF after the brake force BF has started to be applied to the wheel 100 can be suppressed.

When the motor torque MT is generated and the motor torque MT increases, the rotary speed MV of the electric motor 31 gradually becomes smaller.

Further, since the booster circuit 53 continues to be driven while the boost voltage EBST is supplied to the electric motor 31, the temperature TMP of the booster circuit 53 gradually increases. Then, at a fourth timing t4 when the brake force BF is being applied to the wheel 100, when the temperature TMP of the booster circuit 53 reaches the switching temperature determination value TMPTH, the drive process switches from the first drive process to the second drive process. When this happens, the voltage supplied to the electric motor 31 switches from the boost voltage EBST to the reference voltage EBS. As a result, the operation of the booster circuit 53 is stopped, and the protection of the booster circuit 53 can suitably be effectuated. However, in the present embodiment, a difference between the first drive process and the second drive process is in that the voltage supplied to the electric motor 31 is different, and the advance angle control is performed in both the first drive process and the second drive process.

In this case, at the fourth timing t4, the motor torque MT in the present embodiment is greater than the motor torque MT in the case of the comparative example. Due to this, when the reference voltage EBS starts to be supplied to the electric motor 31, the rotary speed MV of the electric motor 31 drops dramatically.

In a case where the temperature TMP of the booster circuit 53 is already equal to or greater than the switching temperature determination value TMPTH upon the activation of the electric motor 31, the electric motor 31 is activated by the second drive process. In a period during which the brake force BF is yet to be applied to the wheel 100, load applied to the electric motor 31 is extremely small, so that the rotary speed MV of the electric motor 31 can promptly be increased. Thus, even in the case where the temperature TMP of the booster circuit 53 is already equal to or greater than the switching temperature determination value TMPTH upon the activation of the electric motor 31, the start of the applying of the brake force BF to the wheel 100 can be brought forward as compared to a case of performing the normal motor control that is not the advance angle control.

The above embodiment may be modified to another embodiment as follows.

As the upper limit value of the temperature at which the booster circuit 53 can be used, a usable temperature upper limit value TMPLM which is greater than the switching temperature determination value TMPTH may be preset. In this case, it can be said as that, when the temperature TMP of the booster circuit 53 is equal to or greater than the switching temperature determination value TMPTH and less than the usable temperature upper limit value TMPLM, this is a state in which the booster circuit 53 is preferably not operated, and when the temperature TMP of the booster circuit 53 is equal to or greater than the usable temperature upper limit value TMPLM, this is a state in which the operation of the booster circuit 53 is prohibited.

Figure 5A:
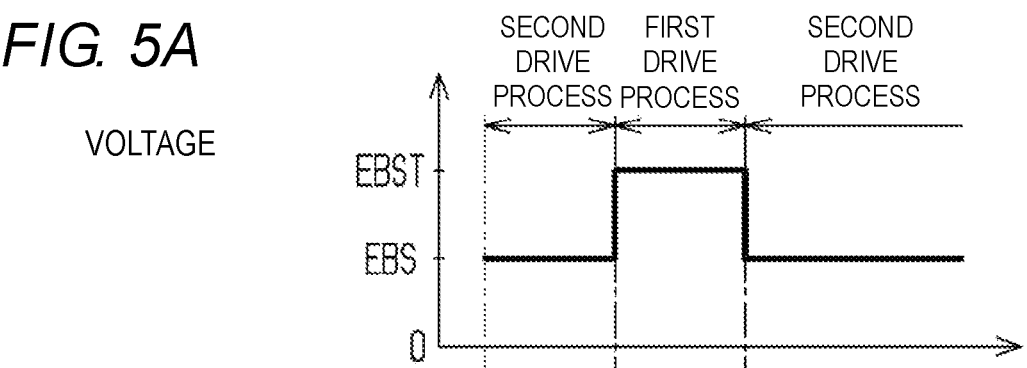
FIG. 5 shows timing charts for a case where it is determined that the driver operating a brake pedal is demanding sudden braking in a brake device of another embodiment, where (a) is a timing chart indicating shifts of a voltage supplied to an electric motor, (b) is a timing chart indicating shifts in a temperature of a booster circuit, and (c) is a timing chart indicating shifts in motor torque (or brake force).
Figure 5B:
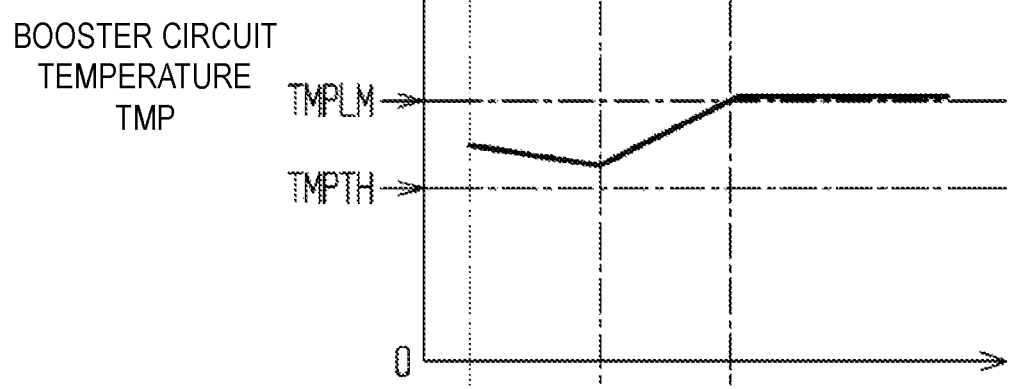
Figure 5C:
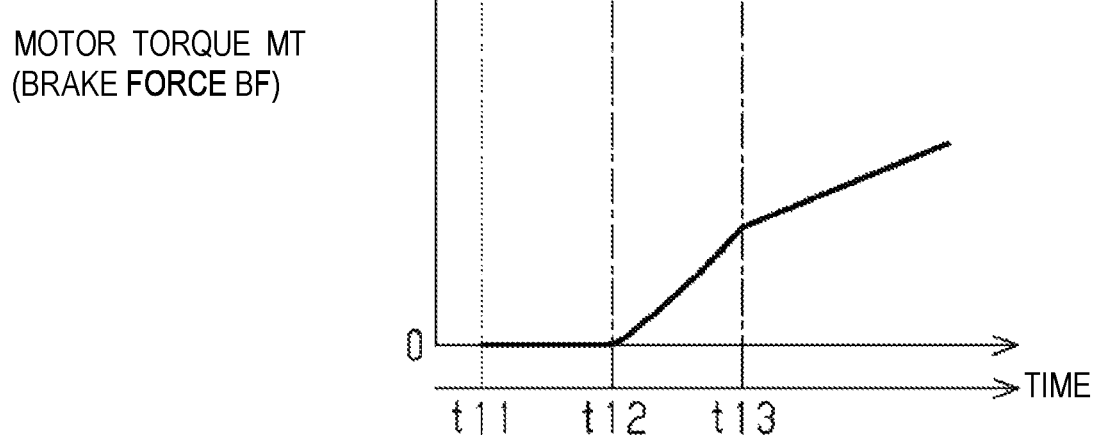

Thus, for example, as illustrated in FIGS. 5 (a), (b), and (c), in a case where the temperature TMP of the booster circuit 53 is equal to or greater than the switching temperature determination value TMPTH and less than the usable temperature upper limit value TMPLM at a first timing t11 when the electric motor 31 is activated, the electric motor 31 may be activated by the second drive process. Upon the activation of the electric motor 31, the load applied to the electric motor 31 is small, so that the increasing speed of the rotary speed MV of the electric motor 31 is greater as compared to the case of performing the normal motor control. Due to this, a period from the activation of the electric motor 31 to the start of the applying of the brake force BF to the wheel 100 can be shortened.

Further, when the brake force BF starts to be applied to the wheel 100 at a second timing t12, the motor torque MT becomes larger, so that the rotary speed MV of the electric motor 31 drops rapidly. Due to this, by detecting such a change in the rotary speed MV, the motor control unit 511 can understand that the brake force BF has begun to be actually applied to the wheel 100. Here, in a case where the temperature TMP of the booster circuit 53 is equal to or greater than the switching temperature determination value TMPTH and less than the usable temperature upper limit value TMPLM, the drive process may be switched from the second drive process to the first drive process at the second timing t12. In this case, the voltage supplied to the electric motor 31 will be the boost voltage EBST, so that the increasing speed of the motor torque MT, that is, the brake force BF, can be increased as compared to the case where the reference voltage EBS continues to be supplied to the electric motor 31. Thus, an operation time of the booster circuit 53 can be shortened as compared to the case of performing the first drive process from the activation of the electric motor 31, by which the temperature rise in the booster circuit 53 can be suppressed while increasing the increasing speed of the brake force BF.

However, when the booster circuit 53 starts to operate by the switch from the second drive process to the first drive process as above, and the temperature TMP of the booster circuit 53 becomes equal to or greater than the usable temperature upper limit value TMPLM at a third timing t13, the drive process is returned to the second drive process to protect the booster circuit 53. Due to this, the supply of the boost voltage EBST to the electric motor 31 is stopped, and the operation of the booster circuit 53 is thereby terminated.

When the electric motor 31 is to be activated in the situation where the temperature TMP of the booster circuit 53 is equal to or greater than the usable temperature upper limit value TMPLM, it is preferable to activate the electric motor 31 by the second drive process to protect the booster circuit 53 and continue performing the second drive process even after the brake force BF has begun to be applied to the wheel 100.

In the above embodiment, in the case where the temperature TMP of the booster circuit 53 is less than the switching temperature determination value TMPTH upon the activation of the electric motor 31, the first drive process is continued to be performed until this temperature TMP becomes equal to or greater than the switching temperature determination value TMPTH. However, no limitation is made hereto so long as the first and second drive processes can be used for different circumstances based on the temperature TMP of the booster circuit 53 upon the activation of the electric motor 31, and another controlling method may be employed.

For example, in the case where the temperature TMP of the booster circuit 53 is less than the switching temperature determination value TMPTH upon the activation of the electric motor 31, the electric motor 31 may be activated by the first drive process, and the drive process may be switched from the first drive process to the second drive process when a performed time period of the first drive process reaches a prescribed switching time. In this case, when the performed time period of the first drive process reaches the switching time, the second drive process may be performed even if the temperature TMP of the booster circuit 53 is less than the switching temperature determination value TMPTH. Further, in a period until the performed time period of the first drive process reaches the switching time, the first drive process may be performed regardless of whether or not the temperature TMP of the booster circuit 53 is equal to or greater than the switching temperature determination value TMPTH. However, even in employing such control configurations, the drive process is switched from the first drive process to the second drive process when the temperature TMP of the booster circuit 53 reaches the usable temperature upper limit value TMPLM in a situation where the performed time period of the first drive process has not yet reached the switching time.

In the above embodiment, even in the case of having activated the electric motor 31 by performing the second drive process due to the temperature TMP of the booster circuit 53 being equal to or greater than the switching temperature determination value TMPTH, the drive process switches from the second drive process to the first drive process when this temperature TMP becomes less than the switching temperature determination value TMPTH while the electric motor 31 is driving. However, in this case, there is a risk that an increasing profile of the brake force BF changes due to the change in the voltage supplied to the electric motor 31, by which the driver may feel discomfort. Due to this, in the case of having activated the electric motor 31 by performing the second drive process due to the temperature TMP of the booster circuit 53 being equal to or greater than the switching temperature determination value TMPTH, the second drive process may be continued even if the temperature TMP becomes less than the switching temperature determination value TMPTH while the electric motor 31 is driving.

In the above embodiment, the temperature TMP of the booster circuit 53 is calculated in estimation by the temperature acquisition unit 513; however, in a case where a temperature sensor is provided in the booster circuit 53, a temperature detected by this temperature sensor may be acquired as the temperature TMP of the booster circuit 53.

In a case where a diagnosis unit for diagnosing whether or not an abnormality such as a failure is occurring in the booster circuit 53 is provided in the control device 50, the first drive process may be performed when it is not determined by this diagnosis unit that an abnormality is occurring in the booster circuit 53. On the other hand, in a case where this diagnosis unit determined that an abnormality is occurring in the booster circuit 53, the second drive process may be performed instead of the first drive process. In this case, a diagnosis result on whether or not an abnormality is occurring in the booster circuit 53 corresponds to the "state of the booster circuit 53".

The first drive process may be a process that performs the normal motor control that is not the advance angle control, so long as it supplies the boost voltage EBST to the electric motor 31. In this case as well, as compared to the case of activating the electric motor 31 by the third drive process, the brake force BF can be started to be applied to the wheel 100 at an earlier stage. Further, the increasing speed of the brake force BF after having started to apply the brake force BF to the wheel 100 can be increased than in the case of performing the second drive process.

In a case where the vehicle is provided with a function to avoid collision between an obstacle located in front along a progressing direction and the vehicle itself, when the sudden braking determination unit 512 determines that the sudden braking is necessary to avoid the collision between the obstacle and the vehicle itself, it may output a notification thereof to the motor control unit 511. Further, in the case where the sudden braking for avoiding the collision between the obstacle and the vehicle itself is being requested, the motor control unit 511 may use the first and second drive processes for different circumstances according to the state of the booster circuit 53 (for example, the temperature TMP of the booster circuit 53). In this case as well, an effect similar to that of the above embodiment can be achieved.

In the above embodiment, the first and second drive processes may be used for different circumstances when the sudden braking is being requested, and the third drive process is performed when the sudden braking is not requested. However, even when the sudden braking is not being requested, the first and second drive processes may be used for different circumstances according to the state of the booster circuit 53 (for example, the temperature TMP of the booster circuit 53) upon the activation of the electric motor 31.

The brake actuator may employ a configuration other than that of the brake actuator 30 so long as the brake force BF according to the rotary amount of the electric motor 31 can be applied to the wheel 100. For example, as such a brake actuator, a so-called electric brake that can transfer the power generated by rotation of the electric motor 31 to the friction members 12 without intervening brake fluid may be exemplified. In this case, the electric brake provided with the brake actuator is provided for each wheel 100.

The invention claimed is:

1. A brake device for a vehicle, the device comprising:
a brake actuator including an electric motor and configured to apply brake force to a wheel in accordance with a rotary amount of the electric motor;
a booster circuit configured to boost a reference voltage, the reference voltage being a voltage output from a vehicle-mounted power source;
a motor control unit configured to control the electric motor; and
a temperature acquisition unit configured to acquire a temperature of the booster circuit, wherein
the motor control unit is configured to switch between a first drive process to drive the electric motor by supplying the electric motor with a boost voltage, the boost voltage being a voltage boosted by the booster circuit, and a second drive process to drive the electric motor by an advance angle control by supplying the electric motor with the reference voltage supplied from the vehicle-mounted power source, based on a state of the booster circuit,
the motor control unit is configured to perform the first drive process when a temperature of the booster circuit acquired by the temperature acquisition unit is less than a switching temperature determination value and to perform the second drive process when the temperature of the booster circuit is equal to or greater than the switching temperature determination value,
a usable temperature upper limit value greater than the switching temperature determination value is preset as an upper limit value of a temperature at which the booster circuit is usable,
the motor control unit is configured to prohibit supply of the boost voltage to the electric motor when a temperature of the booster circuit acquired by the temperature acquisition unit is equal to or greater than the usable temperature upper limit value, and
when the brake force is to be applied to the wheel in a situation where the temperature of the booster circuit acquired by the temperature acquisition unit is equal to or greater than the switching temperature determination value and is less than the usable temperature upper limit value, the motor control unit activates the electric motor by the second drive process and after the motor control unit determines that the brake force is being applied the motor control unit changes the electric motor from the second drive process to the first drive process.

2. A brake device for a vehicle, the device comprising:
a brake actuator including an electric motor and configured to apply brake force to a wheel in accordance with a rotary amount of the electric motor;
a booster circuit configured to boost a reference voltage, the reference voltage being a voltage output from a vehicle-mounted power source;
a motor control unit configured to control the electric motor;
a temperature acquisition unit configured to acquire a temperature of the booster circuit; and
a sudden braking determination unit configured to determines whether there is a request for sudden braking, wherein
the motor control unit is configured to switch between a first drive process to drive the electric motor by supplying the electric motor with a boost voltage, the boost voltage being a voltage boosted by the booster circuit, and a second drive process to drive the electric motor by an advance angle control by supplying the electric motor with the reference voltage supplied from the vehicle-mounted power source, based on a state of the booster circuit,
the motor control unit is configured to perform the first drive process when a temperature of the booster circuit acquired by the temperature acquisition unit is less than a switching temperature determination value, to perform the second drive process when the temperature of the booster circuit is equal to or greater than the switching temperature determination value, and to perform a third drive process to drive the electric motor by supplying the electric motor with the reference voltage,
when the sudden braking determination unit determines there is no request for sudden braking, the motor control unit is configured to perform the third drive process,
when the sudden braking determination unit determines there is the request for sudden braking and the temperature of the booster circuit acquired by the temperature acquisition unit is equal to or greater than a switching temperature determination value, the motor control unit is configured to perform the second drive process, and
when the sudden braking determination unit determines there is the request for sudden braking and the temperature of the booster circuit acquired by the temperature acquisition unit is less than a switching temperature determination value, the motor control unit is configured to perform the first drive process.

* * * * *